Dec. 5, 1961   F. W. VAN LUIK, JR   3,011,390
OPTICAL LINEAR CONDENSATION NUCLEI DEVICE
Filed Aug. 25, 1958   2 Sheets-Sheet 1
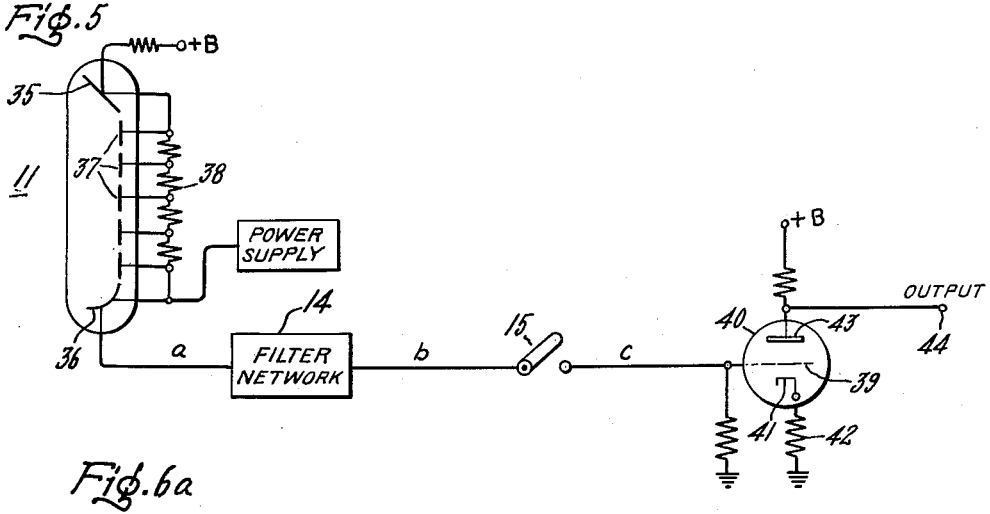
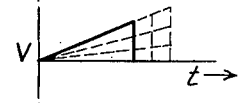
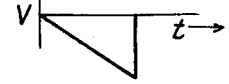
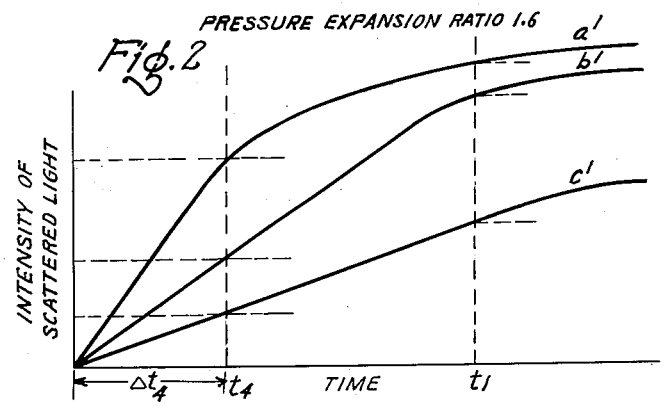
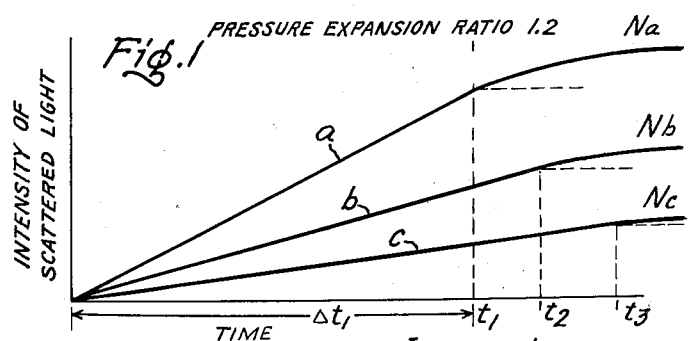
Inventor
Frank W. Van Luik Jr.
by J. David Blumenfeld
His Attorney

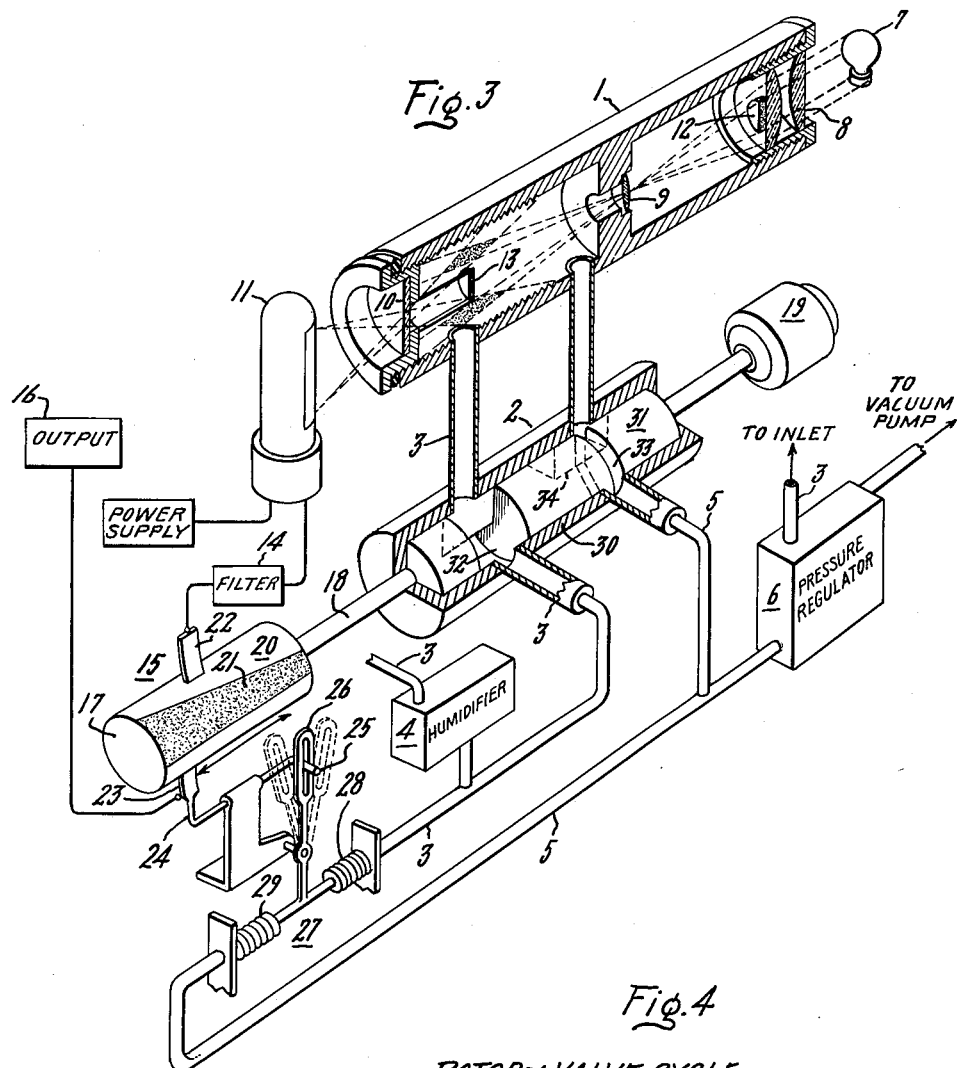
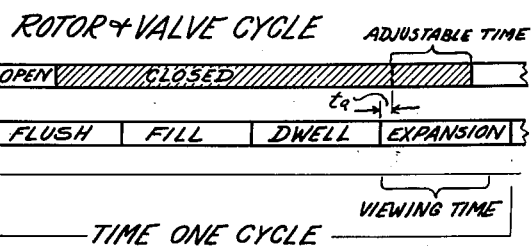
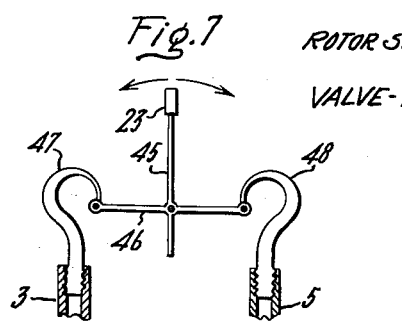

United States Patent Office 3,011,390
Patented Dec. 5, 1961

3,011,390
OPTICAL LINEAR CONDENSATION NUCLEI DEVICE
Frank W. Van Luik, Jr., Schenectady, N.Y., assignor to General Electric Company, a corporation of New York
Filed Aug. 25, 1958, Ser. No. 757,018
4 Claims. (Cl. 88—14)

The instant invention relates to an apparatus for measuring small airborne particulate matter and more particularly, that known as condensation nuclei.

One of the objects of the instant invention is to provide an apparatus for measuring condensation nuclei which has a linear characteristic for various nuclei concentrations and operating conditions. In measuring condensation nuclei it is customary to condense water vapor about the nuclei by an adiabatic expansion and to measure the density of the droplet clouds thus formed to determine the nuclei concentration. One well known cloud density measuring technique relies on the amount of light scattered by the cloud as an index of its density. However, the scattered light is linear with nuclei concentration only during the period of time when the droplet growth, and hence the scattered light, is linear with time, a condition controlled by the amount of water vapor available and the number of nuclei present to abstract this water vapor in growth. Consequently, the period during which the amount of scattered light varies linearly with time depends on the nuclei concentration, since the more nuclei present the faster a given quantity of water vapor is abstracted by the growing droplets and the more rapidly the point is reached when there is insufficient water vapor remaining for the droplets to continue to grow linearly with time. Thus, for a given degree of adiabatic expansion, which determines the quantity of water vapor available for droplet growth, it is desirable to measure only during that period of time when the scattered light varies linearly with time for the highest nuclei concentration to be measured, since during this period the scattered light also varies linearly with time for lesser concentrations. Thus, the actual magnitudes of the scattered light are directly proportional to the nuclei concentration.

If the amount of water vapor available for droplet growth is changed by varying the degree of adiabatic expansion, for example, the rate of droplet growth for a given nuclei concentration varies. It has been found experimentally that this rate of droplet growth increases faster for a given expansion than the increase in the amount of available water vapor. Hence, if the degree of adiabatic expansion is increased, increasing the amount of water vapor, the time during which the droplet growth and scattered light is linear with time is decreased since the droplets abstract the vapor at a much faster rate and more than compensate for the increase in the water vapor. As a result, the period of time during which the cloud density is measured by virtue of the scattered light must be proportionally shortened for the highest concentration to be measured.

It is another object of this invention, therefore, to provide an apparatus for measuring condensation nuclei only during that time period when there is a linear relationship between the nuclei concentration and an output quantity indicative thereof.

It is a further object of this invention to provide a condensation nuclei measuring apparatus which is linear over a wide range of nuclei concentrations.

It is yet another object of this invention, then, to provide a nuclei measuring apparatus in which the time period for measurement varies in response to changes in operating conditions.

Other objects and advantages of this invention will become apparent as the description thereof proceeds.

The above objects are carried out in one embodiment of this invention by forming droplet clouds from nuclei bearing gaseous samples through the mechanism of an adiabatic expansion. The density of the droplet clouds is measured by means of a scattered light system to produce an electrical output quantity which is proportional to the density of the droplet cloud. However, only that portion of the electrical output quantity which is linearly related to the nuclei concentration is applied to a utilization or indicating circuit by interrupting the electrical output quantity after a predetermined period of time during which the growth of the droplet clouds varies linearly with time. The extent of this time period is varied in response to changes in the degree of adiabatic expansion of the gaseous sample so that measuring always takes place during the period of linearity.

The novel features which are believed to be characteristic of this invention are set forth with particularity in the appended claims.

The invention itself, however, both as to its organization and method of operation, together with further objects and advantages thereof, may best be understood by reference to the following description taken in connection with the accompanying drawing in which:

FIGURE 1 shows curves illustrating the relationship of scattered light intensity as a function of time for a fixed adiabatic expansion ratio and varying nuclei concentrations;

FIGURE 2 shows similar curves illustrating the relationship between scattered light and time for a different degree of adiabatic expansion;

FIGURE 3 is a partial cross-sectional view of the novel apparatus of the instant invention;

FIGURE 4 is a chart illustrating the operation cycle of a number of the elements assembly of FIGURE 3;

FIGURE 5 is a circuit diagram of the output circuit for the condensation nuclei measuring device of the instant invention;

FIGURES 6A through 6D are diagrams showing the wave forms of voltages versus time at various points in the circuit of FIGURE 5;

FIGURE 7 is a fragmentary view of a modification of the invention.

In measuring airborne particulate matter such as condensation nuclei, if a nuclei bearing gaseous sample at 100 percent relative humidity is expanded adiabatically so that supersaturation occurs, condensation of excess water vapor occurs initiating growth of droplets about the nuclei. If this process is viewed in an optical chamber in which a light means is so oriented to produce scattered light from the droplets, scattered light intensity as a function of time varies with concentration in a manner illustrated by the curves of FIGURE 1. The curves of $a$, $b$, and $c$ of FIGURE 1 represent different nuclei concentrations $Na$, $Nb$, $Nc$, with $Na > Nb > Nc$, and show the variations of scattered light with time. Each of these curves illustrates two distinct conditions during one of which the scattered light varies linearly with time, and during the other of which the scattered light varies non-linearly with time. The linear portion of the curve, as pointed out previously, represents a condition during which there is adequate water in the form of vapor so that the droplets grow linearly with time. Eventually after a given period of time insufficient vapor remains for the growth to proceed linearly and the scattered light no longer varies linearly with time.

The slope of the linear portion of the curve for a given amount of water vapor (determined by the degree of adiabatic expansion) depends on the particle concentration. Thus, in a curve $a$, which represents the highest concentration the slope of the linear portion is highest and terminates at the time $t_1$. For a lesser concentration, as represented by curve *b*, the rate at which the excess water is removed from the system is lower and, hence, the droplets grow linearly for a longer period. Thus the slope of the curve is lower and the curve is linear with time for a longer period condition illustrated in curve *b* by the linearity of that curve until time $t_2$. Similarly, curve *c* which represents yet a lower nuclei concentration is linear still longer until time $t_3$. It is clear from the curves of FIGURE 1 that if measuring takes place during the period $t=0$ and $t=t_1$, the period of linearity for the highest concentration of nuclei to be measured by the instrument, that the instrument is also linear for lesser concentrations and the magnitudes of the scattered light are proportional to concentration of nuclei to be measured by the instrument.

If however, the degree of adiabatic expansion to which the nuclei bearing gaseous samples are subjected is varied the time relation of scattered light for concentrations N*a*, N*b*, N*c* is shown by a second set of curves *a'*, *b'*, and *c'* in FIGURE 2. These curves have the same general configuration as these in FIGURE 1, i.e., a linear portion and a non-linear portion, but are displaced in time. Thus, with the degree of adiabatic expansion changed (an increasing in the illustrated example to produce a higher degree of supersaturation and a greater quantity of excess vapor) the rate of growth of the droplet for a given nuclei concentration increases. As pointed out previously, the increase in the rate of growth is greater than the increase in the amount of vapor so that for a given concentration the droplets grow faster for a shorter period of time during which the curve is linear. Thus in curve *a'* for a concentration N*a* the period $\Delta t$ of linearity of scattered light with time is reduced from $\Delta t_1$ to $\Delta t_4$. Hence, to insure continued linearity of operation with changes in expansion it is necessary that the measuring period of the instrument be changed correspondingly.

Similarly, if the degree of adiabatic expansion were reduced rather than raised the curves would tend to shift to the right and give longer periods of linearity and hence it might be desirable to adjust their measuring time period correspondingly. In any event, it is apparent from the curves of FIGURES 1 and 2 that the measuring of nuclei for any given degree of adiabatic expansion should take place within that period of time when the scattered light varies linearly with time for the highest concentration of nuclei to be measured and that with changes of the degree of adiabatic expansion this measuring period be correspondingly changed in order to insure that the measurement take place within the period of linear relationship for the new degree of expansion.

Referring now to FIGURE 3 there is illustrated a preferred embodiment of a condensation nuclei measuring device incorporating the principles of the instant invention. There is provided a means for forming droplet clouds from nuclei bearing gaseous samples which comprises an elongated cylindrical chamber means 1 coupled by means of a rotary valve 2 to an input conduit 3 through which nuclei bearing gaseous samples are introduced into the chamber. The input conduit 3 contains a humidifying means 4 of suitable configuration, and shown in block diagram form, for bringing the gaseous samples to 100 percent relative humidity prior to their introduction into the chamber. The expansion chamber 1 is also coupled, through the same rotary valve 2, to an output conduit 5 which is connected to a source of lower pressure such as a vacuum pump, not shown, which supplies a fixed pressure differential to the nuclei bearing samples within the chamber 1. The vacuum pump is connected to the conduit 5 through a pressure regulator 6 of well known construction and shown in block diagram form, which controls and regulates the pressure differential applied to the nuclei bearing samples in the chamber.

Since these samples are introduced into the chamber at 100 percent relative humidity, the sudden expansion due to the application of the fixed pressure differential from the vacuum system produces an instantaneous supersaturation, the degree depending on the pressure differential applied. Since this condition is an unstable one, condensation of the excess water vapor about nuclei in the sample is initiated, forming a cloud of water droplets the density of which about the nuclei is proportional to the nuclei concentration. These droplets begin to grow at a rate depending upon the amount of excess water vapor available and the number of the nuclei present in the chamber.

By measuring the density of the droplet cloud during this period of linear growth of the droplets with time a linear instrument for determining the nuclei concentration may be achieved. To this end, an electro-optical system is provided to produce an electrical output quantity proportional to the droplet cloud density. Hence, a beam of radiant energy is projected through the chamber 1 which energy is scattered by the droplet cloud and impinges on a light sensitive device to produce an electrical output quantity proportional to the cloud density. A source of radiant energy 7, such as an incandescent lamp or the like, is positioned adjacent to a condenser lens assembly 8 mounted in one end of the chamber 1 which lens projects and focusses a beam of light onto a second lens 9 positioned within the chamber. The lens 9 acts as an apparent source of radiant energy and projects the beam through the remaining portion of the expansion chamber onto a transparent exit window 10 mounted in a threaded support assembly and fastened to the opposite end of the chamber. A light sensitive device 11, such as a photomultiplier or the like, is positioned adjacent to the window 10 and is adapted to intercept light scattered by the droplet cloud within the expansion chamber to produce an electrical output quantity proportional to the scattered light and, hence, to the droplet cloud density.

To insure that only scattered light impinges upon the radiation sensitive device, the optical assembly within the same chamber is so constructed and arranged that direct passage of light from the source 7 to the radiation sensitive device is prevented. A circular opaque member 12 is secured to the surface of one of the elements of the condenser lens 8 and blocks a portion of the light from source 7. The size of the opaque disc 12 is such that a cone of darkness is produced within the beam which covers the transparent window 10 leaving the radiation sensitive device 11 unilluminated in the absence of a droplet cloud. A second opaque circular disc 13 is fastened to the opposite end of the chamber and in front of the window 10 to insure further that there is no direct transmission of light between the source and the radiation sensitive device 10.

Upon the appearance of a droplet cloud however, light is scattered from the hollow cone of light in the chamber, and intercepted by the radiation sensitive device 11. This scattering area within the chamber is illustrated schematically in FIGURE 3 by means of the dotted portion. The radiation sensitive device 11 thus produces an electrical output signal which is proportional to the scattered light which is, in turn, a function of the nuclei concentration.

As is pointed out previously, however, the amount of scattered light and consequently the output signal from the radiation sensitive device 11 varies linearly as a function of nuclei concentration only during the period when the droplet growth varies linearly with time. Consequently, the output quantity from the device 11 is applied to an output or indicating circuit only during this linear period. To this end, the output from the radiation sensitive device 11 is connected through a filter element 14, illustrated in block diagram form, to a timing switch mechanism 15 which interrupts the output electrical quantity from the radiation sensitive device after the predetermined time, thus applying the electrical output quantity only as it is varying linearly with nuclei concentration to an output circuit, such as a peak reading voltmeter 16, illustrated in block diagram form.

Timing switch 15 comprises a cylindrical rotor member 17 secured to a drive shaft 18 and driven in synchronism with the control valve 2 from a suitable driving means such as a motor 19. Rotor 17 is constituted of a conducting surface 20 having an axially extending, variable width non-conducting insulating strip 21. A pair of brushes 22 and 23, the latter of which is axially movable along the length of the rotor 17, are respectively connected to the output of the filter 14 and to the input of the output circuit 16. It is apparent from the construction of the timing switch 15 that in the course of a single rotation of the rotor 17 the electrical output quantity from the radiation sensitive device is applied to the output circuit 16 through the brushes 22 and 23 and the conducting portion of the rotor. The length of time during which the switch is closed and applies the electrical quantity to the output circuit is determined by the axial position of the brushes 22, 23 and the width of the non-conducting portion of the rotor at a given axial position. That is, whenever the brushes 22 and 23 contact the non-conducting portion of the rotor, the switch 15 is opened and interrupting electrical quantity. Consequently, by axially positioning one of the brush members along the rotor 17, the time in each cycle at which the output signal is interrupted may be varied There is provided a means to vary the length of time during which the output quantity is applied to the output circuit in response to changes in the degree of adiabatic expansion applied to the nuclei bearing samples. To this end, the lower brush element 23 is secured to a lever 24 which is moved laterally in response to changes in pressure differential applied to the samples in the chamber 1. Hence, a projection 25 of the lever member 24 rides in a pivoted yoke 26 secured to and rotatable by a pressure differential device 27. The pressure differential device 27 comprises a pair of flexible bellows 28 and 29 connected respectively to the input and output conduits 3, 4, and 5, and rotates the yoke 26 in response to changes in the pressure differential applied to the expansion chamber. Rotation of the yoke 26 causes projection 25 to move in the yoke slot translating rotation of the yoke into lateral movement of the brush 23 along the rotor controlling the time at which the output electrical quantity is interrupted.

The rotary valve assembly 2 which controls the admission and expansion of nuclei bearing gaseous samples in the expansion chamber, includes a cylindrical hollow body portion 30 having the input and output conduits 3 and 5 communicating with the interior thereof. Positioned within the hollow bore is a cylindrical rotor member 31 connected to a drive shaft driven by the motor 19. The valve rotor 31 contains a first recessed portion 32 adapted to come into periodic communication with the input conduit to permit admission of fresh nuclei bearing samples into the chamber. A second recessed portion axially displaced along the rotor allows periodic communication between the expansion chamber 1 and the vacuum pump, and comprises a first narrow slotted portion 33 communicating with a broad recess portion 34. The recessed portions 32, 33 and 34 are so positioned that during the course of one revolution of the rotor 31 a fresh sample is introduced into the chamber and the old sample is flushed out. The fresh sample in the chamber is permitted to come to thermal equilibrium and then a fixed pressure differential from the vacuum pump is applied expanding the sample, forming the droplet cloud. In order to achieve all of these sequential operations, the recessed portion 32 extends for 270° of the rotor whereas the narrow slotted recess 33 extends for 90° and the wide recess 34 for 135°, with the leading edge of the recessed portion 33 being 90° ahead of the leading edge of the recess portion 32. The precise construction of the valve 2 and the relationship thereof with expansion chamber 1 is disclosed and claimed in application Serial No. 600,540, filed July 27, 1956, entitled "Condensation Nuclei Detector," Bigelow et al. and assigned to the assignee of the present invention.

FIGURE 4 illustrates, by way of a chart, the operational cycle both for the valve 2 and the timing switch means 15. Thus, it can be seen that valve 2 during one rotation of the rotor 31 goes through four distinct operational sequences. First, the flush portion wherein a fresh sample is brought into the chamber and the old one flushed out with both the inlet and outlet conduits open. The outlet conduit is then closed but the inlet conduit remains opened to permit the chamber to fill with the new sample. Next, the sample is brought to thermal equilibrium during the dwell portion with both inlet and outlet conduits closed. Finally, the outlet conduit opens applying a pressure differential from the vacuum pump system to the chamber and expanding the gaseous samples. It is to be noted that the timing switch assembly closes midway during the flush portion of the cycle and remains closed until a predetermined time, illustrated at $t_a$, after the initiation of the expansion cycle. The precise length of the time period after the initiation of the expand portion of the cycle and hence the formation of the droplet cloud is adjustable by means of the timing switch assembly 15 in response to changes in the pressure differential applied to the sample.

Referring now to the FIGURE 5, there is illustrated a schematic circuit diagram of the output circuit for the radiation sensitive device 11 incorporating the novel switch element of the instant invention. The light sensitive device 11 is, in a preferred embodiment, a photomultiplying device comprising a collector 35 connected to the positive terminal indicated at +B of a voltage supply through a suitable anode resistor, and a photoelectric cathode element 36, upon which the scattered light impinges. A series of secondarily emissive electrodes or dynodes 37 are positioned between the cathode and anode elements and provide the well known electron multiplication within the device. A voltage divider 38, one end of which is connected to the negative terminal of a high voltage supply, provides voltage for the photoemissive cathode 36 as well as the individual dynode members 37. As is well known in a device of this type, an electron emitted by the action of impinging light on the photocathode 36 is drawn towards the successive dynodes 37, each of which emits a number of secondary electrons for each impinging electron. As a consequence of this secondary emission characteristic, a multiplied stream of secondary electrons strikes the collector 35 to produce an output signal which is proportional to the intensity of the light striking the photoemissive cathode 36. The output electrical quantity produced at the anode of the photomultiplying device is connected to the input of a filter network 14 of well known construction, and illustrated in block diagram form, which removes all alternating voltage components and produces at the output thereof, varying direct current voltage, the amplitude of which is proportional to the density of the droplet cloud and, hence, the amount of scattered light. Connected to the output of the filter nework is a switch mechanism 15, illustrated schematically, which interrupts the varying D.-C. voltage after a fixed period of time to insure, as explained previously, that the output voltage is linearly related to the droplet cloud density and, hence, to the nuclei concentration. Thus, the timing switch mechanism 15 periodically applies the electrical quantity from the photomultiplying device to the input control electrode 39 of a space discharge device 40 of the vacuum triode type. The triode comprises a cathode 41 connected to a source of reference potential, such as ground, by means of a suitable cathode resistor 42 and an anode 43 which is connected through a suitable resistor to the positive terminal, indicated at +B, of a high voltage supply. Connected to the anode of the discharge device 40 is an output terminal 44 which is connected to a storage and indicating device, such as a peak reading voltmeter, not shown, which produces an output proportional to the magnitude of the electrical quantity, and thus may indicate and be calibrated directly in terms of nuclei concentrations.

FIGURES 6a–d illustrate the wave forms at various points of the circuit illustrated in FIGURE 5 and are helpful in understanding the operation of the system. Thus, FIGURE 6a shows the wave form of the output voltage appearing at the anode of the full or multiplying device comprises a voltage varying with time that rises linearly for a portion thereof and then varies non-linearly for the remaining portion. The time varying voltage illustrated in 6a contains a number of alternating current components due to such extraneous factors as the 60 cycle flicker from the light source 7, which alternating components are removed by applying this signal to the filtering element 14.

The time varying voltage appearing at the output of the filter 14 is illustrated in FIGURE 6b and now has the alternating current components removed and includes linear and non-linear portions. The time varying wave form of FIGURE 6b is interrupted by means of the timing switch 15 in such a manner that only the linear portion of that wave form is transmitted to the control electrode of the amplifying means 40. FIGURE 6c shows this interrupted wave form. As may be noted from this figure, the time varying wave form has now been terminated and interrupted so that the non-linear portion thereof is not applied to the amplifying element. Thus, the amplitude of the time varying signal is now linearly related to the scattered light and hence, the nuclei concentration. Time varying signals of differing amplitudes, illustrated by the dashed lines in FIGURE 6c, now represent concentrations of lower value and the magnitudes of the voltages may be directly compared in order to determine the relative concentrations. The point in time at which the wave form of FIGURE 6c is interrupted is, of course, varied with changes of expansion ratio.

FIGURE 6d illustrates the inverted and amplified wave shape of FIGURE 6c which appears at the output terminal 44 connected to the anode of the triode 40. This wave shape is now applied to a utilization circuit such as a peak reading voltmeter, which stores the peak magnitude of this voltage which may then be applied to an indicating means calibrated directly in nuclei concentrations. It is apparent then, that by utilizing a condensation nuclei measuring apparatus of this type and interrupting the electrical output quantity from the electro-optical system after a predetermined period, this electrical output quantity is measured only during the period when it is linearly related to the nuclei concentration. Hence, this instrument may utilize linear indicating scales and has a constant calibration for varying expansion ratios.

In the apparatus of FIGURE 3 the pressure differential means to adjust the position of the brushes along the rotor 17 is illustrated as a pair of flexible bellows adapted to position the yoke 26 as a function of the pressure differential. FIGURE 7 illustrates an alternative embodiment of such a positioning means wherein the movable brush element 23 is secured to a lever 45 mounted on a rocker arm 46 fastened to a differential pressure sensing device, comprising a pair of Bourdon tubes 47 and 48 having the input conduit 3 and the output conduit 5 connected. As is well known in such devices, the Bourdon tubes tend to straighten under the influence of the internal pressure applied thereto and hence, position the lever and the brush secured thereto as a function of the differential pressure applied thereto.

While a particular embodiment of this invention has been shown, it will of course be understood that it is not limited thereto, since many modifications, both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a linear condensation nuclei device the combination comprising, means to form droplet clouds from condensation nuclei bearing gaseous samples by subjecting said samples to a predetermined pressure differential, measuring means to determine the nuclei concentration including an electro-optical means associated with said first named means to produce an electrical output proportional to the droplet density, means coupled to said electro-optical means to apply the output to a utilization circuit during the period when the droplet growth varies linearly with time and said output varies linearly with nuclei concentration, said last named means including a rotary switch for interrupting said output after a predetermined time, said switch comprising a cylindrical rotor having a conductive portion and an axially extending nonconductive portion, and means contacting said rotor whereby said switch is opened and said output is interrupted after said predetermined time, and means to move said contacting means axially along said rotor to vary the interruption time for said output in response to changes in the pressure differential to which said samples are subjected.

2. In a linear condensation nuclei measuring device, the combination comprising means to expand nuclei bearing gaseous samples by subjecting them to a predetermined pressure differential to form droplet clouds about the entrained nuclei, measuring means associated with said first named means for measuring the density of said droplet clouds as an indication of the nuclei concentration, and means for controlling the measuring interval of said measuring means including means responsive to the predetermined pressure differential to which said samples are subjected and operatively coupled to said measuring means to enable said measuring means for a predetermined interval only during which time the rate of growth of droplet formation is linear to thereby produce a linear output from said measuring means.

3. In a linear condensation nuclei measuring device, the combination comprising means to expand nuclei bearing gaseous samples by subjecting them to a pressure differential to form droplet clouds about the entrained nuclei, measuring means associated with said first named means for measuring the density of said droplet clouds as an indication of the nuclei concentration, and means for controlling the measuring interval of said measuring means including switch means operatively connected to said measuring means for enabling said measuring circuit upon closure, and pressure sensitive means operatively coupled to said switch means and to said means for expanding the nuclei bearing gaseous sample for varying the closure time of said switch means for a predetermined interval only during which time the rate of growth of droplet formation is linear in response to changes in the pressure differential to which said samples are subjected to produce a linear output from said measuring means.

4. In a linear condensation nuclei measuring device, the combination comprising means for expanding nuclei bearing gaseous samples by subjecting them to a pressure differential to form droplet clouds about the entrained nuclei, measuring means for determining the nuclei concentration including electro-optical means associated with said first named means for producing an electrical output proportional to the cloud density from the optical characteristics of said clouds, a utilization circuit adapted to receive said electrical output to provide an indication of the nuclei concentration from said output, and rotary timing switch means for controlling the measuring interval of said measuring means in response to changes in said pressure differential, said switch means being coupled between said electro-optical means and said utilization circuit to interrupt said electrical output after a predetermined time period during which the droplet cloud is linear with time, and pressure sensitive means operated in response to said pressure differential to control the closure time of said switch whereby said output is supplied to the utilization circuit only during the period when said output is linearly related to the nuclei concentration.

References Cited in the file of this patent

UNITED STATES PATENTS

| | | | |
|---|---|---|---|
| 1,969,626 | Simon et al. | Aug. 7, | 1934 |
| 2,684,008 | Vonnegut | July 20, | 1954 |
| 2,763,853 | Grant | Sept. 18, | 1956 |

OTHER REFERENCES

Review of Scientific Instruments, vol. 26, pages 703–710, July 1955. Q184.R5.